United States Patent [19]

Morgan

[11] 4,373,515
[45] Feb. 15, 1983

[54] SOLAR COLLECTOR

[76] Inventor: Raleigh E. Morgan, 461 E. Santan, Chandler, Ariz. 85224

[21] Appl. No.: 173,955

[22] Filed: Jul. 31, 1980

[51] Int. Cl.³ .............................................. F24J 3/02
[52] U.S. Cl. ..................................... 126/438; 126/446
[58] Field of Search ............... 126/438, 439, 443, 446, 126/449, 450

[56] References Cited

U.S. PATENT DOCUMENTS

| Re. 30,027 | 6/1979 | Hockman | 126/438 |
| 4,167,936 | 9/1979 | Hackworth | 126/438 |
| 4,170,985 | 10/1979 | Authier | 126/438 |
| 4,194,492 | 3/1980 | Tremblay | 126/438 |
| 4,215,674 | 8/1980 | Riggs et al. | 126/438 |
| 4,275,711 | 6/1981 | Dumbeck | 126/438 |

Primary Examiner—James C. Yeung
Assistant Examiner—Lee E. Barrett
Attorney, Agent, or Firm—Don J. Flickinger

[57] ABSTRACT

A hollow cylindrical energy accumulator having a helically encircling fluid circulating conduit is exposed to direct solar radiation and to radiation redirected by an arcuate reflector.

8 Claims, 3 Drawing Figures 4,373,515

SOLAR COLLECTOR

FIELD OF THE INVENTION

This invention relates to the field of solar energy.

In a further aspect, the present invention relates to solar collectors.

More particularly, the instant invention concerns a solar collector especially adapted for elevating the temperature of a fluid medium.

DESCRIPTION OF THE PRIOR ART

The sun is a potential source of abundant and readily available energy. However, solar radiation striking the surface of the earth is sufficiently diffuse to prohibit direct application to the performance of useful functions. For example, solar radiation which can create ambient temperatures of 110° Fahrenheit or above in desert regions of the southwestern United States, is incapable of elevating the temperature of standing water to the area of approximately 140° Fahrenheit as required for general domestic purposes. Accordingly, the prior art has provided various apparatus, solar collectors, for the purpose of gathering sunlight and creating a desired useful effect.

In general, conventional solar collectors can be broadly classified as either concentration collectors or flat plate collectors. Concentration collectors incorporate a reflector element which focally redirects sunlight. Flat plate collectors employ various techniques which increase absorption of radiation.

Flat plate collectors have the ability to collect radiation from widely varied angles. This is particularly advantageous under conditions of reduced radiation such as usually prevails in certain geographic locations and as periodically occurs in all areas. Disadvantageously, however, flat plate collectors generally do not produce substantial increases of temperature.

Concentration collectors, on the other hand, produce considerably elevated temperatures. The efficiency of a concentration collector, not possessing the omnidirectional characteristics of the flat plate collector, tends to greatly diminish in the absence of direct sunlight.

The prior art has proposed various solutions in an attempt to overcome the deficiences inherent in both types of collectors. Concentration collectors have been provided with intricate, expensive tracking devices to maintain the collector at a favorable solar angle. The physical size of flat plate collectors has been increased for absorption over a greater area. These and other proposals, while increasing the complexity of solar devices, have failed to provide adequate remedy. It would be highly advantageous, therefore, to remedy the foregoing and other deficiences inherent in prior art collectors.

Accordingly, it is an object of the present invention to provide an improved solar collector.

Another object of the invention is the provision of a solar collector especially adapted for elevating the temperature of a fluid medium.

And another object of the invention is the provision of an omnidirectional solar collector.

Still another object of this invention is to provide a solar collector which is relatively efficient under conditions of diffuse or reduced radiation.

Yet another object of the invention is the provision of a solar collector which combines direct absorption with focal redirection.

Yet another object of the instant invention is to provide a solar collector having improved means for circulation of the fluid medium.

And a further object of the invention is the provision of a solar collector incorporating an accumulator for storing heat.

Still a further object of the invention is to provide a solar collector of relatively simple design.

And still a further object of the invention is the provision of a solar collector having improved efficiency.

Yet still another object of the invention is to provide a solar collector according to the above which is comparatively lightweight, durable and inexpensive to manufacture.

SUMMARY OF THE INVENTION

Briefly, to achieve the desired objects of the instant invention in accordance with a preferred embodiment thereof, first provided is an energy accumulator having an outer surface, a portion of the surface being directly exposed to solar radiation. Spaced from the accumulator is a reflector having a reflective surface for receiving and redirecting solar radiation to the surface of the accumulator. A conduit resides in juxtaposition with the surface of the accumulator. The conduit extends along a circuitous path such that portions thereof are exposed to direct solar radiation and alternate portions thereof are exposed to solar radiation redirected by the reflective surface. The temperature of a fluid medium circulated through the conduit is elevated in response to transfer of energy from the energy accumulator and direct and indirect solar radiation received by the conduit.

In a more specific embodiment, the energy accumulator is in the form of an elongate hollow cylindrical tube having closed ends to form a heat chamber therein. The conduit helically encircles the outer surface of the tube. First and second terminal end portions of the conduit extend diametrically through the tube at spaced locations in the same direction and lie in the same plane.

BRIEF DESCRIPTION OF THE DRAWINGS

The foregoing and further and more specific object and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENTS

Figure 1:
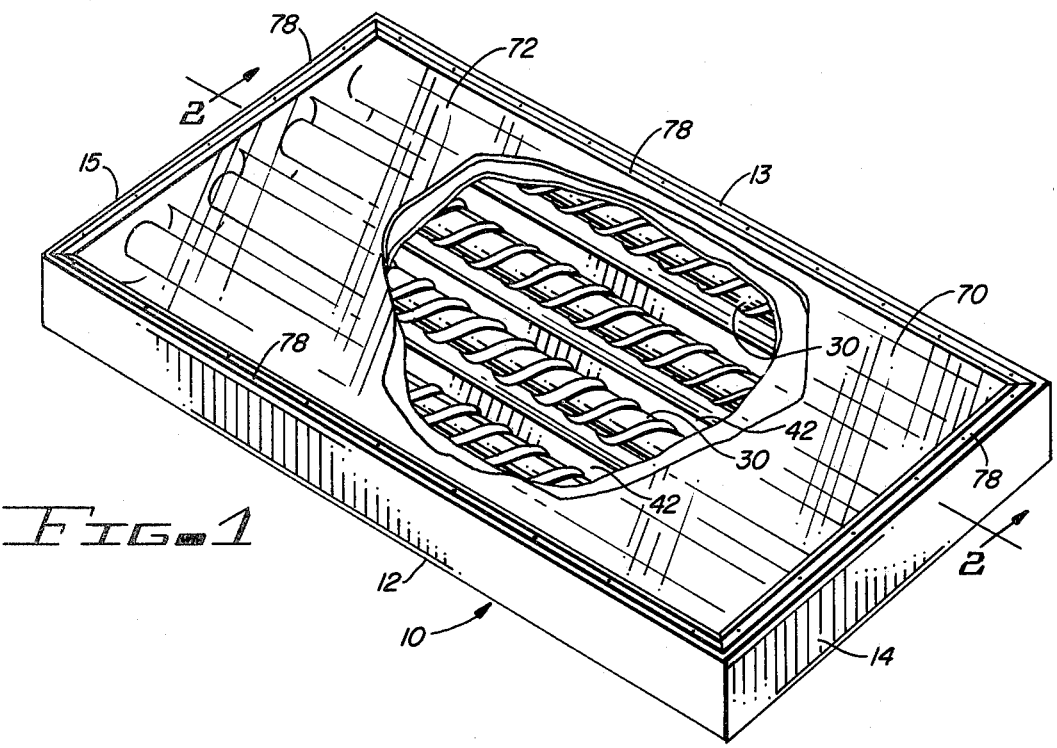
FIG. 1 is a perspective view of a solar collector constructed in accordance with the teachings of the instant invention, a portion thereof being broken away for purposes of illustration.
Figure 2:
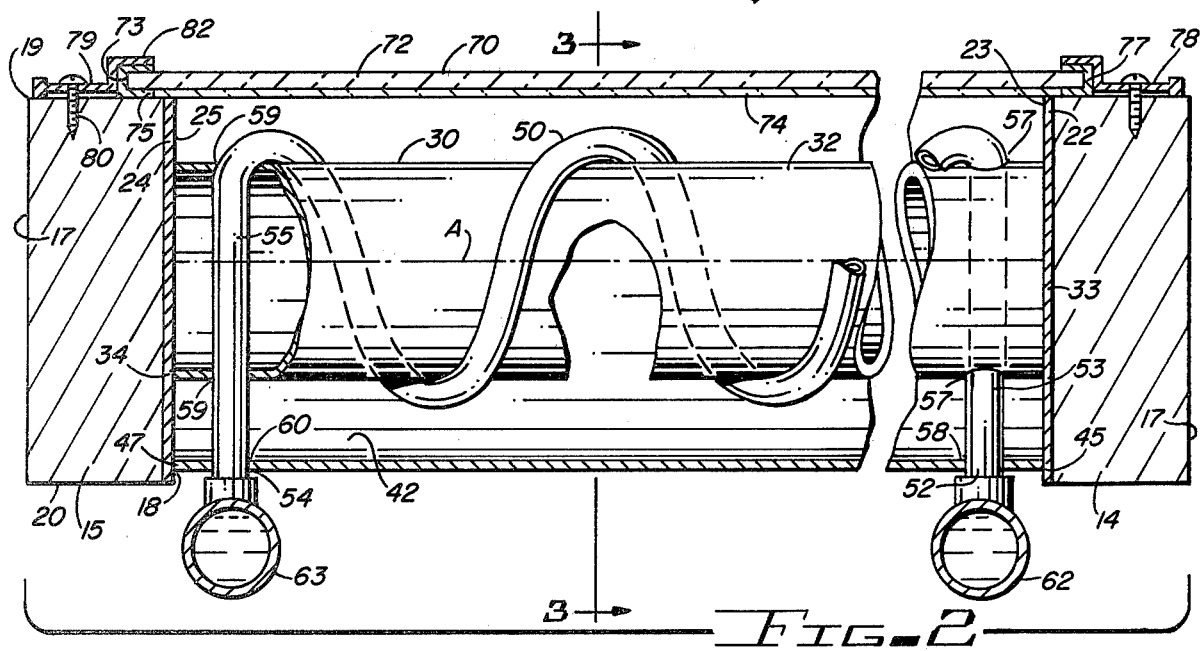
FIG. 2 is an enlarged fragmentary, vertical, sectional view taken along the line 2—2 of FIG. 1.

Turning now to the drawings in which like reference characters indicate corresponding elements throughout the several views, attention is first directed to FIG. 1 as it would appear when fabricated in the form of a modular unit supported by a frame, generally designated by the reference character 10 including spaced apart longitudinal side members 12 and 13 and a pair of lateral end members 14 and 15. With further reference to FIG. 2, it is seen that lateral end member 15 includes upright inner and outer sides 18 and 17, respectively, top 19 and bottom 20. Although not specifically illustrated, but as will be appreciated, longitudinal side members 12, 13 and lateral end member 14 include elements corresponding to the elements of lateral end member 15, which taken together form the outer side 17, inner side 18, top 19 and bottom 20 of frame 10.

Preferably, frame 10 is fabricated of a nonthermal conducting material such as plastic or wood. Construction is in accordance with conventional techniques well known to those skilled in the art. While a solar collector embodying the principles of the instant invention may be made in any convenient or desired size, representative dimensions have been assigned to facilitate orientation and understanding. Arbitrarily chosen for purposes of immediate discussion is an external lateral measurement of four feet and an external longitudinal measurement of eight feet.

A plurality of spaced parallel energy accumulators 30 are carried within frame 10. Preferably, each energy accumulator 30 is in the form of a hollow tube having outer cylindrical surface 32, first end 33 and second end 34. The several energy accumulators 30 are held in compression between lateral end members 14 and 15 with first end 33 of abutting lamina 22 and second end 34 abutting lamina 24. Outer cylindrical surface 32 is concentric about longitudinal axis A seen as a broken line in FIG. 2 and as a point in FIG. 3. Consistent with the foregoing representative dimensions, the energy accumulators 30 are readily fabricated of commercially available thin walled aluminum tube having a five inch outside diameter.

A reflector 40, having reflective surface 42, is associated with each energy accumulator 30. Each reflective surface 42 is generally arcuate in cross-section, being spaced from and partially encircling the respective energy accumulator 30. The center, or focus, of arcuate reflective surface 42 lies along axis A. It is within the scope of the instant invention that generally arcuate surface 42 assumes various optional specific configurations such as circular, parabolic, hyperbolic, logarithmitic spiral or other similar curved functions as are well known in the art.

Preferably, the several reflectors 40 are formed from a single sheet, such as the sheet material used in the fabrication of lamina 22 and 24, having longitudinal edges 43 and 44 and lateral edges 45 and 47. Lateral edges 45 and 47 abut lamina 22 and 24, respectively. A portion of the sheet adjacent edges 43 and 44 are secured to the inner sides 18 of longitudinal side members 13 and 12, respectively. Edges 43 and 44 reside approximately flush with top 19 of frame 10. As specifically noted in FIG. 3, an additional longitudinal support element 48, extending between lateral end members 14 and 15, may be employed as additional support for the several reflectors 40.

A conduit 50 resides in juxtaposition with each energy accumulator 30. In accordance with the immediately preferred embodiment of the invention, each conduit 50, which includes a first end 52, first terminal end portion 53, second end 54 and second terminal end portion 55 helically encircles the outer cylindrical surface 32 of the respective energy accumulator 30. First terminal end portion 53 extends through a pair of aligned apertures 57 proximate the first end 33 of energy accumulator 30 and an aligned aperture 58 through reflector 40. Similarly, second terminal end portion 55 extends through apertures 59 proximate second end 34 of energy accumulator 30 and corresponding apertures 60 through reflector 40.

Figure 3:
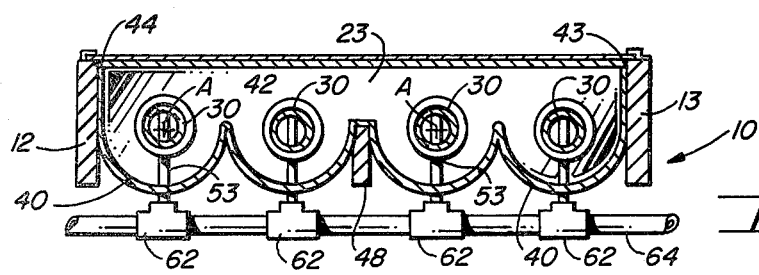
FIG. 3 is a reduced vertical sectional view taken along the line 3—3 of FIG. 2.

Corresponding to the foregoing exemplary measurements and materials, conduit 50 is fashioned from one-half inch diameter copper tubing. A tee 62 is secured to each end 52 by conventional means such as low temperature brazing. Another tee 63 is similarly secured to each end 54. The several tees 62, as seen in FIG. 3, are joined in series by feed line 64. Although not specifically illustrated, the several tees 63 are joined by a similar feed line. One of the feed lines is considered the in feed line, the other being the out feed line. Accordingly, in response to normal line pressure or an auxiliary pump, a fluid medium, such as water, is caused to circulate through each conduit 50.

The face side of the solar collector of the instant invention is defined by a radiation admitting cover 70 extending across frame 10. Preferrably, cover 70 includes a rigid transparent plate 72 having peripheral edge 73 and an underlying layer of film 74 having peripheral edge 75. Preferred materials for transparent plate 72 and film 74 are glass and teflon, respectively. Other materials suitable for the purpose are well known as will be appreciated by those skilled in the art. A seal 77, such as conventional caulking or channel section resilient material, encases edge 73 of plate 72. Cover 70 is held against top 19 of frame 10 by elongate hold down strips 78. Each hold down strip 78, as seen in cross-section in FIG. 2, includes a base section 79 secured to the top surface 19 of frame 10 by conventional wood screws 80 and a lip 82 extending over the edge 73 of plate 72.

The solar collector of the instant invention, being omnidirectional, is especially adapted for stationary mounting. Ideally, the collector is positioned at an incline with either lateral end member 14 or 15 being the bottom edge and cover 70 oriented perpendicular to the sun's rays at apparent noon. Sunlight or radiation passing through cover 70 at any angle is divided into two components. A first component falls directly upon energy accumulator 30. A second component by-passing energy accumulator 30 strikes reflective surface 42 and is redirected toward energy accumulator 30. Accordingly, the upper portion of surface 32 normally receives direct radiation while the under portion of surface 32 normally receives indirect radiation.

To enhance the absorption of solar energy applied to accumulator 30, a selective black finish is applied to surface 32. It is well known that in the presence of a constant heat source, the temperature within a closed vessel will rise substantially above the ambient temperature. The interior of heat accumulator 30, being hollow and having closed ends, functions as a heat chamber, being superheated to temperatures above ambient. It is seen, therefore, that the solar collector of the instant invention has excellent energy collecting qualities capable of functioning on days of diminished sunlight and retaining heat after the sun has set.

Preferably, conduit 50 is in contact with surface 32. Accordingly, heat absorbed by energy accumulator 30 is transferred to coil 50, thus heating the fluid medium circulated through the conduit. The fluid medium is further heated in response to the exposure of conduit 50 to direct and indirect radiation. Helically encircling energy accumulator 30, conduit 50 has upper portions thereof exposed to direct solar radiation and alternate lower portions exposed to indirect radiation reflected from surface 42.

It is especially pointed out that the raised or soldered joints securing tees 62 and 63 to the respective ends of conduit 50 reside externally. Similarly, it is noted that no solder, sealant, adhesive or other material subject to deterioration in the presence of elevated temperatures, reside within the collector. Accordingly, the solar collector of the instant invention is capable of withstanding extremely elevated temperatures. Also, the unidirectional flow of fluid through conduit 50 reduces energy demands upon the selected pump or circulating system.

Various changes and modifications to the embodiment herein chosen for purposes of illustration will readily occur to those skilled in the art. For example, while specifically described as a modular unit including four energy accumulators, it is anticipated that the device may be fabricated in any convenient size as a modular unit, or alternately, fabricated on site as an integral part of a structure. In this regard, longitudinal side members 12 and 13 may be the rafters of a roof with cover 70 substantially lying in the plane thereof. Similarly, conduit 50 may follow any convenient circuitous path in juxtaposition with energy accumulator 30. The materials of construction are also subject to variants. Copper or other materials may be substituted for the preferred aluminum from which energy accumulator 30 is fabricated. Analogously, conduit 50 may be fashioned from aluminum or other commercially available tubing. Further, heat retention may be increased by the application of a thermoinsulating material, such as a foamed plastic material, to the exterior side of reflectors 40.

To the extent that such modifications and variations do not depart from the spirit of the invention, they are intended to be included within the scope thereof which is assessed only by a fair interpretation of the following claims.

Having fully described and disclosed the present invention, and alternately preferred embodiments thereof, in such clear and concise terms as to enable those skilled in the art to understand and practice the same, the invention claimed is:

1. A solar collection for receiving solar radiation and for utilizing the energy therein to increase the temperature of a fluid medium, said solar collector comprising:
   a. a first plurality of hollow cylindrical energy accumulators, each energy accumulator having an outer surface, a portion of said surface being directly exposed to said solar radiation, and each energy accumulator having first and second holes therethrough proximate each end thereof;
   b. a second plurality of arcuate reflectors, each reflector spaced from and associated with a different one of said accumulators and having a reflection surface for receiving solar radiation and redirecting said radiation to the surface of its associated accumulator, each of said second plurality of reflectors having a first aperture therethrough at a first end thereof and a second aperture therethrough at a second end thereof;
   c. a third plurality of conduits for circulating said fluid medium therethrough, each of said conduits residing in juxtaposition with the surface of an associated one of said first plurality of accumulators, the temperature of said fluid medium being elevated in response to transfer of said energy from said energy accumulators, each of said third plurality of conduits having a first terminal end portion passing through the holes in the first of its associated collector and through the aperture in a first end of its associated reflector, and having a second terminal end portion passing through the holes in each second end of its associated collector and through the aperture in the second end of its associated reflector;
   d. a fluid medium supply line coupled to each of said first terminal end portions of each of said third plurality of conduits for supplying said fluid medium thereto; and
   e. a fluid medium outlet line coupled to each of said second terminal end portions of each of said third plurality of conduits for receiving said fluid medium therefrom.

2. The solar collector of claim 1, wherein each of said conduits extends along a circuitous path, portions of each of said conduits being directly exposed to said solar radiation and alternate portions thereof being exposed to the radiation redirected by its association reflector.

3. The solar collector of claim 2, wherein each of said conduits helically encircles the outer surface of its associated collector.

4. The solar collector of claim 3, wherein said second terminal end portion extending through its associated accumulator in the same direction as said first terminal end portion and spaced from and lying in the same plane as said first terminal end portion.

5. The solar collector of claim 2 wherein each of said cylindrical accumulators has closed ends to form a heat chamber therein.

6. The solar collector of claim 5 wherein said first and second holes in each end of said accumulator are diametrically aligned.

7. The solar collector of claim 6 wherein the aperture in each end of each of said second plurality of reflectors is aligned with the first and second holes in each end of its associated accumulator.

8. The solar collector of claim 3 wherein said second plurality of arcuate reflectors are joined to each other at the edges thereof and are integrally formed.

* * * * *